May 15, 1956 J. B. WAGEMANN 2,745,694
BALE LIFT
Filed May 2, 1952 2 Sheets-Sheet 1

INVENTOR.
JOHN B. WAGEMANN,
BY
McMorrow, Berman & Davidson
ATTORNEYS.

May 15, 1956 J. B. WAGEMANN 2,745,694
BALE LIFT
Filed May 2, 1952 2 Sheets-Sheet 2
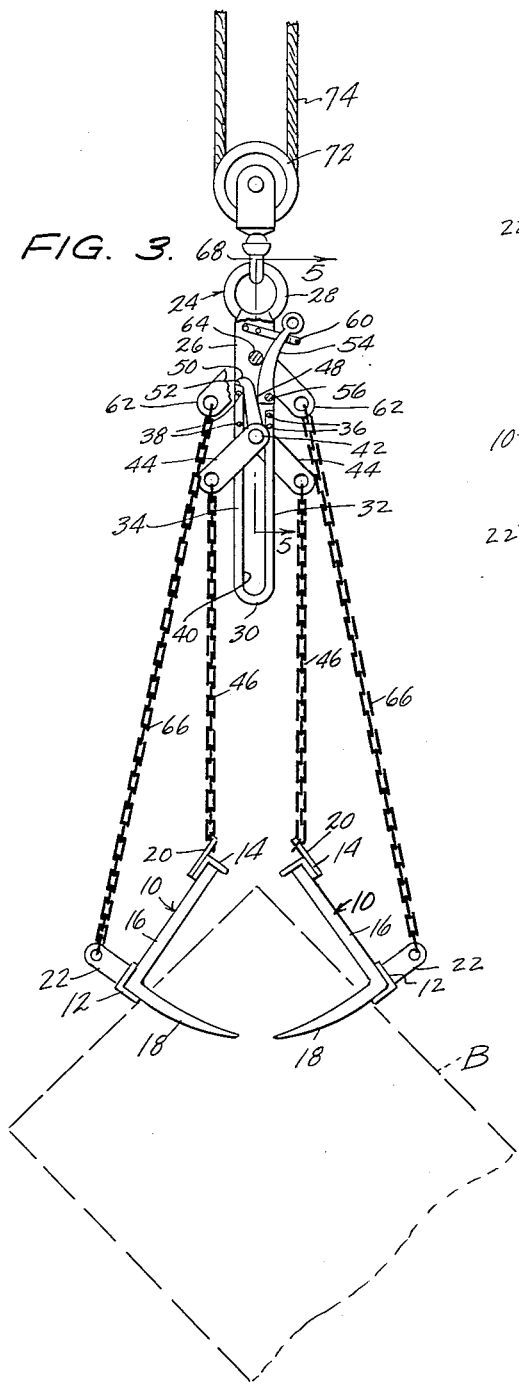
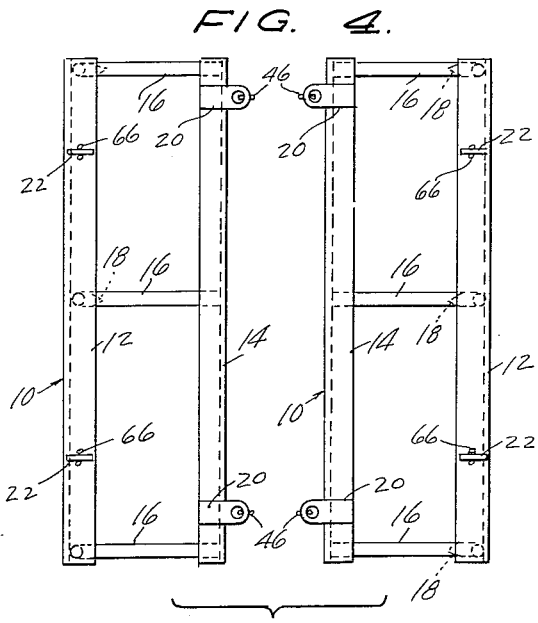
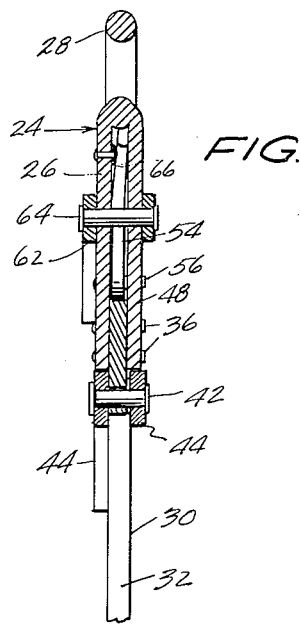
INVENTOR.
JOHN B. WAGEMANN,
BY
McMorrow, Berman & Davidson
ATTORNEYS.

United States Patent Office 2,745,694
Patented May 15, 1956

2,745,694

BALE LIFT

John B. Wagemann, Bethany, Ill.

Application May 2, 1952, Serial No. 285,769

3 Claims. (Cl. 294—109)

The present invention relates to a lift or hoist for bales of hay and like objects. More particularly, the invention has reference to a hoist of the character described which is so formed as to engage a plurality of conventionally formed, conventionally stacked bales, for the purpose of elevating the bales to a suitable storage space.

It is one important object of the present invention to provide a hoist of the character referred to which will be so formed as to normally dispose the component parts thereof in positions in which the hoist can be dropped down upon the upper surfaces of a plurality of bales stacked adjacent one another; which will include a means for relatively adjusting said parts to cause the bales to be gripped for elevation to a storage area; and which will include remotely controlled release means effective to disengage the lift from the bales supported thereby.

Another important object is to provide a lift of the character referred to which is formed particularly for engaging a plurality of bales while said bales are in the positions in which they are conventionally stacked on a truck or similar vehicle, and which will be further formed to maintain the bales in said relative positions during the elevation thereof, so as to effect the release of the bales in such a manner as to cause them to be stacked in a selected storage area in the same manner in which they were stacked within the truck.

Summarized briefly, the invention includes a pair of frames arranged in side by side relation, said frames being provided with depending, bale-engaging teeth along their outer sides. The frames are disposed below a supporting body adapted for connection to a lifting cable or the like, said body having a vertical slot. Flexible elements are connected to the inner and outer sides, respectively, of the respective frames, the elements connected to the inner sides being provided with a connection to the supporting body that slides between the upper and lower ends of the slot. The flexible elements connected to the outer sides of the frames are connected to the supporting body at an unchanging location. Means is provided for releasably retaining the connection of the first-named elements at the upper end of the slot, in a manner that will cause the teeth of the frames to be inclined in downwardly converging relation for gripping a plurality of bales to be lifted. When the bales have been moved over a storage area, a release means, adapted for remote control, is operated to cause the connection of the first-named elements to shift to the lower end of the slot, in a manner effective to create a responsive upward pull on the outer sides of the frames, thus to cause the bales to be released.

Other objects will appear from the following description, the claims appended thereto, and from the annexed drawing, in which like reference characters designate like parts throughout the several views, and wherein:

Figure 3 is a view similar to Figure 1, a bale to be lifted being shown in dotted lines, the parts of the hoist being illustrated in their bale-engaging positions;

Figure 4 is a sectional view taken on line 4—4 of Figure 1; and

Figure 5 is an enlarged longitudinal sectional view through the supporting body of the device, taken on line 5—5 of Figure 3, a portion of said body being broken away.

Figure 1:
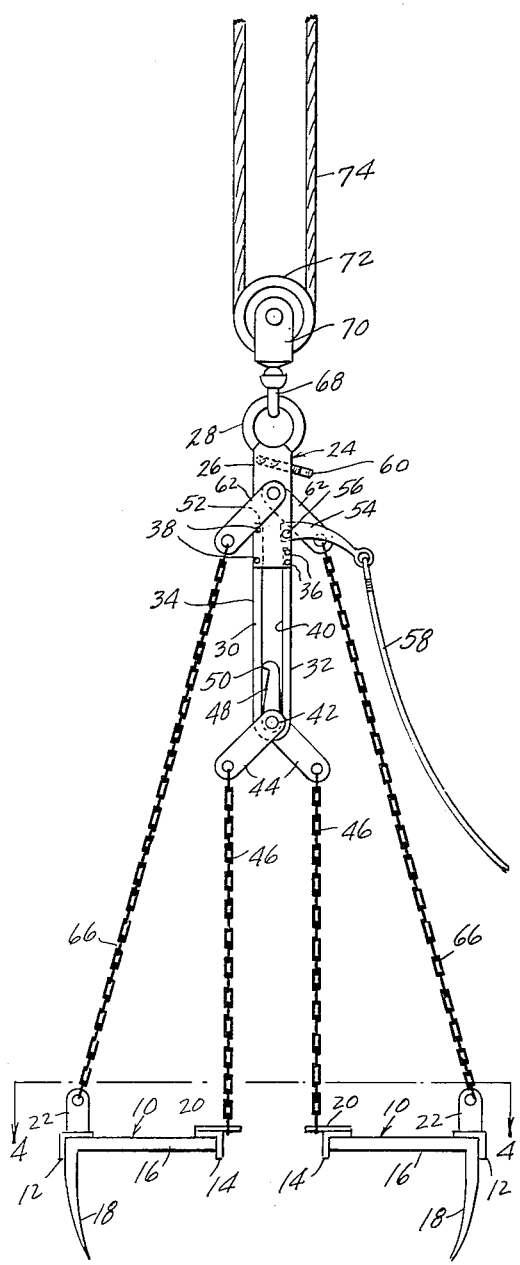
Figure 1 is an end elevational view of a bale lift or hoist formed in accordance with the present invention.

Referring to the drawings in detail, the hoist constituting the present invention includes a pair of frames designated generally by the reference numeral 10. The frames are of identical, though opposite construction, and accordingly, the description of one will suffice for both.

Each of the frames 10 is of rectangular outer configuration when viewed in top plan (Figure 4) and is provided with an outer longitudinal frame member 12 and an inner longitudinal frame member 14. The frame members 12, 14 are arranged in parallelism, and are coextensive in length, said members being preferably formed from angle iron material or the like.

At locations spaced longitudinally of the frame 10, the members 12 and 14 are rigidly connected by cross members 16 extending therebetween, said cross members being respectively secured to the members 12 and 14, at the opposite ends of the cross members, by welding or equivalent fastening means.

Each cross member 16 is integral, at its outer end, with a depending, elongated tooth 18, thus to provide, on each frame, a longitudinal series of spaced teeth that depend from the outer side edges of the frame. As will be noted from Figure 1, the frames 10 are normally disposed in horizontal position, the teeth 18 normally extending substantially vertically from the outer side edges of the frames. The teeth, as will be seen from Figures 1 and 3, are curved longitudinally to a slight extent, toward one another, this curvature being desirable to facilitate engagement of the teeth with one or more bales B of hay or the like.

From the description which has so far been provided, it is to be observed that the respective frames 10 are of flat, rectangular shape, with each frame being provided, along its outer side edge, with a longitudinal series of depending, elongated hooks or teeth.

The inner longitudinal members 14 of the respective frames 10 are disposed adjacent one another, and fixedly secured to each longitudinal member 14 is a plurality of attachment plates 20. The respective plates 20 are of flat formation, and are welded or otherwise fixedly secured to the upper surfaces of the members 14, each plate having one end projecting laterally of its associated member 14, in the direction of the adjacent frame 10, the projecting end of each plate being provided with an aperture.

The outer longitudinal members 12 of the frame 10 are also provided with attachment plates 22, the attachment plates 22 being fixedly secured at their lower ends to their associated members 12 and extending vertically from said associated members, in the direction of a frame-supporting body or carrier designated generally by the reference numeral 24. The carrier 24 is disposed above the frames 10, and includes as a component part thereof a pair of parallel, flat, vertically disposed plates 26 spaced apart at their upper ends by an attachment ring 28, which is welded or otherwise fixedly secured to the plates.

Fixedly secured to and between the lower end portions of the plates 26 is an elongated, U-shaped member 30, said member including parallel, vertically disposed legs 32, 34.

As will be noted from Figure 1, the legs 32 and 34 are of different lengths, the leg 32 being shorter than the leg 34 and being fixedly attached to the lower end of the plates 26 by rivets 36. The leg 34 is fixedly attached to the plates 26 by rivets or equivalent fastening elements 38.

The use of a U-shaped member such as has been shown at 30, attached to the lower end of plates 26, forms on the frame-supporting body or carrier 24 an elongated, vertical slot 40 closed at its opposite ends. Extending transversely through the slot is a pin 42, and rigid at their inner ends with the pin are links 44, said links being extended downwardly from the pin in downwardly diverging relation and being provided, at their divergent ends, with apertures receiving the upper ends of flexible elements 46. The flexible elements 46 can be appropriately termed a first series of elements, the elements of the respective series associated with the respective frames being connected at their lower ends to the attachment plates 20 of the frames.

Pivotally mounted at its lower end upon the pin 42, and extending upwardly from the pin, is a latch member 48 having at its free end a laterally extended finger 50. The finger 50 is adapted, when the pin 42 is at the upper end of the slot 40, to overlie an inclined shoulder 52 defined by the upper end of the longer leg 34 of the U-shaped member 30 (Figure 3).

Pivotally mounted upon the plates 26, adjacent the upper end of the slot 40, is a locking arm 54, said arm being swingable between opposite extreme positions illustrated in Figures 1 and 3 respectively. The locking arm, when in the position thereof shown in Figure 1, is adapted to release the latch member 48 from engagement with the shoulder 52, and it will thus be seen that the inclination of the shoulder 52 and the shoulder-engaging surface of the finger 50 will cause the latch member 48 to slip out of engagement with the shoulder, thereby permitting the pin 42 to gravitate to the lower end of the slot 40.

When, however, the locking arm 54 is swung upwardly from the position thereof shown in Figure 1, it will cause the latch member to be held in engagement with the shoulder 52, thus to retain the pin 42 at the upper end of the slot 40.

For the purpose of permitting the locking arm 54 to be swung from its latch member-engaging position shown in Figure 3 to its latch member-releasing position shown in Figure 1, a cable 58 is attached to the free end of the locking arm, said cable providing a remote control means for swinging the locking arm downwardly.

The pivotal connection of the locking arm to the plates 26 is accomplished by a pin 56.

When the locking arm 54 is swung to its latch member-engaging position, it will be held in said position by means of a spring clamp 60 secured to one plate 26 adjacent the attachment ring 28.

From the description which has been provided above, it is to be noted that the links 44 and pin 42 provide a first connection, adapted to connect the first series of elements 46 to the body or carrier 24, with said first connection being adjustable vertically of the body and being adapted to be releasably engaged in its upwardly adjusted position.

A second pair of links 62 are connected to the intermediate portions of the plates 26, at their inner ends, by a pin 64 extending through a suitable opening formed in said intermediate portion of the plate. The links 62 are rigid with and extend from the pin 64 in downwardly diverging relation, and are formed at their outer ends with openings receiving the upper ends of flexible elements 66. The flexible elements 66 are attached to the attachment plates 22, at their lower ends, thus to provide a second series of elements connected to the outer side edges of the respective frames 10.

The links 62, and their associated pins 64, provide a second connection, which attaches the second series of elements 66 to the carrier 24 at an unchanging location, the first connection being adjustable vertically of the carrier relative to said second connection.

The carrier 24, and the other parts of the device supported thereby, are suspended, in use, from a conventionally formed elevating device including, in the illustrated example, a swivel 68 having at its upper end a yoke 70 between the arms of which a sheave or pulley 72 is journaled, a lifting cable 74 being passed about said pulley. The swivel 68 is provided, at its lower end, with a ring or hook receiving the attachment ring 28.

Figure 2:
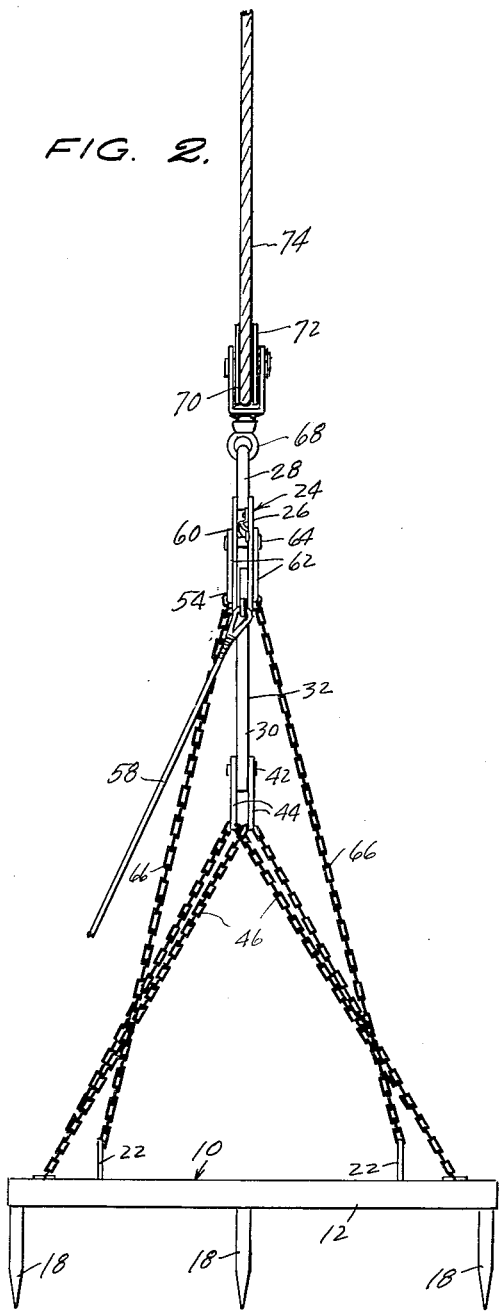
Figure 2 is a side elevational view.

In use of the device, it will be assumed that a plurality of conventionally stacked bales B is to be moved from a truck or trailer, and elevated to a loft or other storage area. Accordingly, the parts of the lift or hoist are initially disposed in the position thereof shown in Figures 1 and 2, this being the normal position of said parts. Since the pin 42 is disposed at the lower end of the slot 40, the frames 10 will be horizontally arranged, with the teeth 18 extending substantially vertically therefrom.

The teeth 18 are so spaced apart as to permit each tooth or hook to engage a separate bale B. In the illustrated example shown in Figure 3, the teeth of the respective frames are all in engagement with a single bale, and it may be noted that the device can be used for elevating a single bale, if desired. However, the main adaptability of the device resides in its ability to elevate not only a single bale, but a plurality of bales normally stacked in side by side relation within a truck or suitable vehicle.

In any event, with each tooth 18 engaged in a separate bale, the pin 42 is manually elevated to the upper end of the slot 40, and the finger 50 is placed in engagement with the shoulder 52. The locking arm 54 is then swung upwardly, so as to lock the pin 42 at the upper end of the slot.

The entire device, and the bales B supported thereby, are now elevated, to shift the bales over a suitable storage area, and when the bales are to be released, it is merely necessary that the locking arm 54 be swung to its release position. The weight of the bales will cause the finger 50 to slip out of engagement with the shoulder 52, and as a result, the pin 42 will gravitate to the lower end of the slot 40.

The result is to cause slack in the first series of flexible elements 46 of each frame 10, and this will create a responsive upward pull, by the second series of elements 66, tending to disengage the hooks or teeth 18 from the supported bales. The bales will thus drop into the storage area, and will remain in the same relative positions in which they were disposed prior to movement to said storage area.

The invention, in actual practice, has been found to have certain valuable characteristics, in that the device is so formed as to cause the engagement of a number of stacked bales merely by dropping the lift onto the upper surfaces of a plurality of side by side bales disposed at the upper end of the stack. Thereafter, it is merely necessary that the pin 42 be locked in its upper position, after which the bales will be firmly gripped by the teeth 18, which will now be disposed in inclined positions and will extend from their associated frames 10 in downwardly converging relation.

When the bales are to be released, the release is accomplished by remote control, and this also is a valuable characteristic of the invention.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a bale hoist, a frame carrier including a body adapted to be suspended above bales and like objects to be lifted and having a generally vertical slot; a pair of bale-engaging frames disposed in side-by-side relation below said body and having their inner sides arranged adjacent one another; bale-engaging teeth depending from the outer sides of the frames and normally extending vertically from the frames; first and second flexible elements connected to the inner and outer sides, respectively, of each frame and extended upwardly from the frames toward said body; a pin extending through and slidable longitudinally of the slot between the upper and lower ends thereof; connecting links carried by said pin and extended therefrom in downwardly diverging relation, said links being respectively connected, at their divergent ends, to the first elements of the respective frames; means connecting the second elements to said body at a location spaced from said slot, said pin being adjustable vertically of the body relative to said means and being adapted, when adjusted to the upper end of the slot, to tense the first elements for swinging the inner sides of the frames upwardly, whereby to incline the teeth of the respective frames in downwardly converging relation for gripping said bales to be lifted, said pin when adjusted to the lower end of the slot being adapted to create slack in the first flexible elements effective to produce a responsive upward pull by the second flexible elements on the outer sides of the frames tending to return the teeth to their normal positions, for disengagement of the teeth from said bales; and means for releasably locking said pin in the upwardly adjusted position thereof, including a latch member pivotally mounted upon the pin to swing laterally of the line of vertical adjustment of the pin, said latch member extending substantially vertically and upwardly from the pin in the plane of the slot walls and being held against lateral swinging movement by the slot walls in all positions of the pin except the upwardly adjusted position thereof, the latch member having at its free end a laterally extended finger, a shoulder on said body disposed laterally of said line of vertical adjustment and with which said finger is engageable on swinging of the latch member in one direction in the upwardly adjusted pin position, said finger being proportioned to slide off said shoulder on freeing of the latch member for swinging in an opposite direction responsive to downward pull exerted on the pin by a supported object, and a locking arm pivotally mounted on said body to swing between substantially vertical and horizontal extreme positions, said locking arm in its vertical position biasing the latch in the first-named direction of movement thereof into engagement with said shoulder.

2. In a bale hoist, a frame carrier including a body adapted to be suspended above bales and like objects to be lifted and having a generally vertical slot; a pair of bale-engaging frames disposed in side-by-side relation below said body and having their inner sides arranged adjacent one another; bale-engaging teeth depending from the outer sides of the frames and normally extending vertically from the frames; first and second flexible elements connected to the inner and outer sides, respectively, of each frame and extended upwardly from the frames toward said body; a pin extending through and slidable longitudinally of the slot between the upper and lower ends thereof; connecting links carried by said pin and extended therefrom in downwardly diverging relation, said links being respectively connected, at their divergent ends, to the first elements of the respective frames; means connecting the second elements to said body at a location spaced from said slot, said pin being adjustable vertically of the body relative to said means and being adapted, when adjusted to the upper end of the slot, to tense the first elements for swinging the inner sides of the frames upwardly, whereby to incline the teeth of the respective frames in downwardly converging relation for gripping said bales to be lifted, said pin when adjusted to the lower end of the slot being adapted to create slack in the first flexible elements effective to produce a responsive upward pull by the second flexible elements on the outer sides of the frames tending to return the teeth to their normal positions, for disengagement of the teeth from said bales; a shoulder on the body adjacent the upper end of the slot; a latch member pivotally mounted on said pin and engageable by said shoulder to releasably engage the pin against movement from the upper end of the slot, said latch member extending substantially vertically and upwardly from the pin in the plane of the slot walls and being held against lateral swinging movement by the slot walls in all positions of the pin except the upwardly adjusted position thereof; and a locking arm pivoted on the body and swingable between opposite extreme positions in one of which it engages the latch member against disengagement from said shoulder and in the other of which it frees the latch member from engagement with the shoulder, for movement of the pin to the lower end of the slot.

3. In a bale hoist, a frame carrier including a body suspendable above bales and like objects to be lifted, said body comprising a flat plate adapted for connection to a supporting cable, and a U-shaped member secured to one face of and depending from the plate, the legs of said member defining therebetween a vertical slot on the body, the upper end of one of said legs being proportioned to form a shoulder on said face of the plate; a pair of flat, rectangular, bale-engaging frames disposed in side-by-side relation below said body and respectively having parallel inner and outer side edges, the inner side edges of the frames being arranged adjacent one another; bale-engaging teeth rigid with and depending from the outer side edges of the frames and normally extending vertically from said frames; first and second flexible elements connected to the inner and outer side edges, respectively, of each frame and extended upwardly from the frames toward said body; a pin extending through and slidable longitudinally of the slot between the upper and lower ends thereof; connecting links carried by said pin and extended therefrom in downwardly diverging relation, said links being respectively connected, at their divergents ends, to the first elements of the respective frames; means connecting the second elements to said body at a location spaced from said slot, said pin being adjustably vertically of the body relative to said means and being adapted, when adjusted to the upper end of the slot, to tense the first elements for swinging the inner side edges of the frames upwardly, whereby to incline the teeth of the respective frames in downwardly converging relation for gripping said bales to be lifted, said pin when adjusted to the lower end of the slot being adapted to create slack in the first flexible elements effective to produce a responsive upward pull by the second flexible elements on the outer side edges of the frames tending to return the teeth to their normal positions, for disengagement of the teeth from said bales; a latch member pivotally mounted on said pin and engageable, in one position to which it is swung, by said shoulder to releasably engage the pin against movement from the upper end of the slot, said latch member extending substantially vertically and upwardly from the pin in the plane of the slot walls and being held against lateral swinging movement by the slot walls in all positions of the pin except the upwardly adjusted position thereof; and a locking arm pivoted on the plate and swingable between opposite extreme positions in one of which it engages the latch member against disengagement from said shoulder and in the other of which it frees the latch member from engagement with the shoulder, for movement of the pin to the lower end of the slot.

References Cited in the file of this patent

UNITED STATES PATENTS

| | | |
|---|---|---|
| 327,639 | Yeutzer | Oct. 6, 1885 |
| 915,017 | Castagnos | Mar. 9, 1909 |
| 2,312,808 | Ferris | Mar. 2, 1943 |
| 2,551,235 | Bates | May 1, 1951 |